United States Patent
Carr

(10) Patent No.: US 6,901,534 B2
(45) Date of Patent: May 31, 2005

(54) CONFIGURATION PROXY SERVICE FOR THE EXTENDED FIRMWARE INTERFACE ENVIRONMENT

(75) Inventor: Russell L. Carr, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 10/052,830

(22) Filed: Jan. 15, 2002

(65) Prior Publication Data

US 2003/0135785 A1 Jul. 17, 2003

(51) Int. Cl.⁷ .................................................. G06F 11/00
(52) U.S. Cl. ............................ 714/27; 714/33; 713/1
(58) Field of Search ............................ 714/27, 43, 44, 714/40, 33; 713/1, 100; 719/327

(56) References Cited

U.S. PATENT DOCUMENTS

| | | | | |
|---|---|---|---|---|
| 5,809,329 A | * | 9/1998 | Lichtman et al. | 710/8 |
| 5,878,257 A | * | 3/1999 | Nookala et al. | 600/405 |
| 2003/0033397 A1 | * | 2/2003 | Gurumoorthy et al. | 709/223 |
| 2003/0097581 A1 | * | 5/2003 | Zimmer | 713/200 |
| 2003/0182545 A1 | * | 9/2003 | Chalmers et al. | 713/1 |
| 2004/0205258 A1 | * | 10/2004 | Wilson et al. | 710/1 |

OTHER PUBLICATIONS

Extensible Firmware Interface Specification, Intel Corporation, Version 1.02 (Dec. 12, 2000).

* cited by examiner

Primary Examiner—Scott Baderman
(74) Attorney, Agent, or Firm—Molly A. McCall

(57) ABSTRACT

A method of abstracting information through object interfaces is described. The object interfaces are used to present platform device information in a pre-boot service environment. Firmware tables such as Advanced Configuration and Power Interface and System Management Basic Input/Output System may be used to auto-configure diagnostic test suites through an abstracted software interface.

12 Claims, 4 Drawing Sheets

CONFIGURATION PROXY SERVICE FOR THE EXTENDED FIRMWARE INTERFACE ENVIRONMENT

FIELD OF THE INVENTION

The present invention pertains to the field of field diagnostics support. More particularly, the present invention relates to a method to provide auto-configuration of diagnostic test models in the field to match the system's configuration.

BACKGROUND OF THE INVENTION

Firmware is a set of hardware setup programs. Firmware is typically stored in flash memory or read only memory. Firmware includes programs such as device drivers, which are used to activate the hardware of a standard computer system. For example, a personal computer may include hardware for performing operations such as reading keystrokes from a keyboard, transmitting information to a video display, or sending information to a printer.

The operating system (OS) performs functions such as scheduling application programs and resolving conflicts among applications that request access to the same resources. Moreover, operating systems communicate service requests from application programs to the hardware device drivers. Examples of operating systems include DOS, Windows, and UNIX.

The Extensible Firmware Interface (EFI) is an architecture specification. The EFI provides an interface between the OS and the platform firmware. The interface is in the form of data tables that contain platform-related information, and boot and runtime service calls that are available to the OS and its loader. The EFI helps provide a standard environment for booting the OS and running system maintenance applications.

The EFI provides a coherent, scalable platform environment. The specification defines a complete solution for the firmware to completely describe platform features and surface platform capabilities to the OS during the boot process. The EFI definitions are compatible with both 32 bit Intel Architecture (IA-32) and 64 bit Intel Architecture (IA-64) based processors.

FIG. 1 shows the principal components of EFI and their relationship to the platform hardware 150 and the OS software 110. The platform firmware is able to retrieve the OS loader image from the EFI system partition 100. The specification provides for a variety of mass storage device types including disk, CD-ROM, and DVD as well as remote boot via a network.

Once the platform firmware has begun to retrieve the OS loader image, the OS loader 120 continues to boot the complete operating system 110 at approximately the same time. In doing so, the OS loader may use the EFI boot services 130 and interfaces defined by EFI or other required specifications 160 to survey, comprehend, and initialize the various platform components and the OS software that manages them. The EFI runtime services 140 and console services 170 are also available to the OS loader 120 during the boot phase.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The configuration proxy service provides configuration information for the interface between the OS and the platform firmware. For one embodiment of the invention, the interface is the EFI service environment. The configuration information is abstracted from the platform's underlining configuration reporting standards prior to booting the system. The machine is booted to the EFI service partition prior to running the OS. Once the operating system begins running, the OS activity is given priority over the EFI service environment and the configuration proxy operation is terminated.

Figure 1:
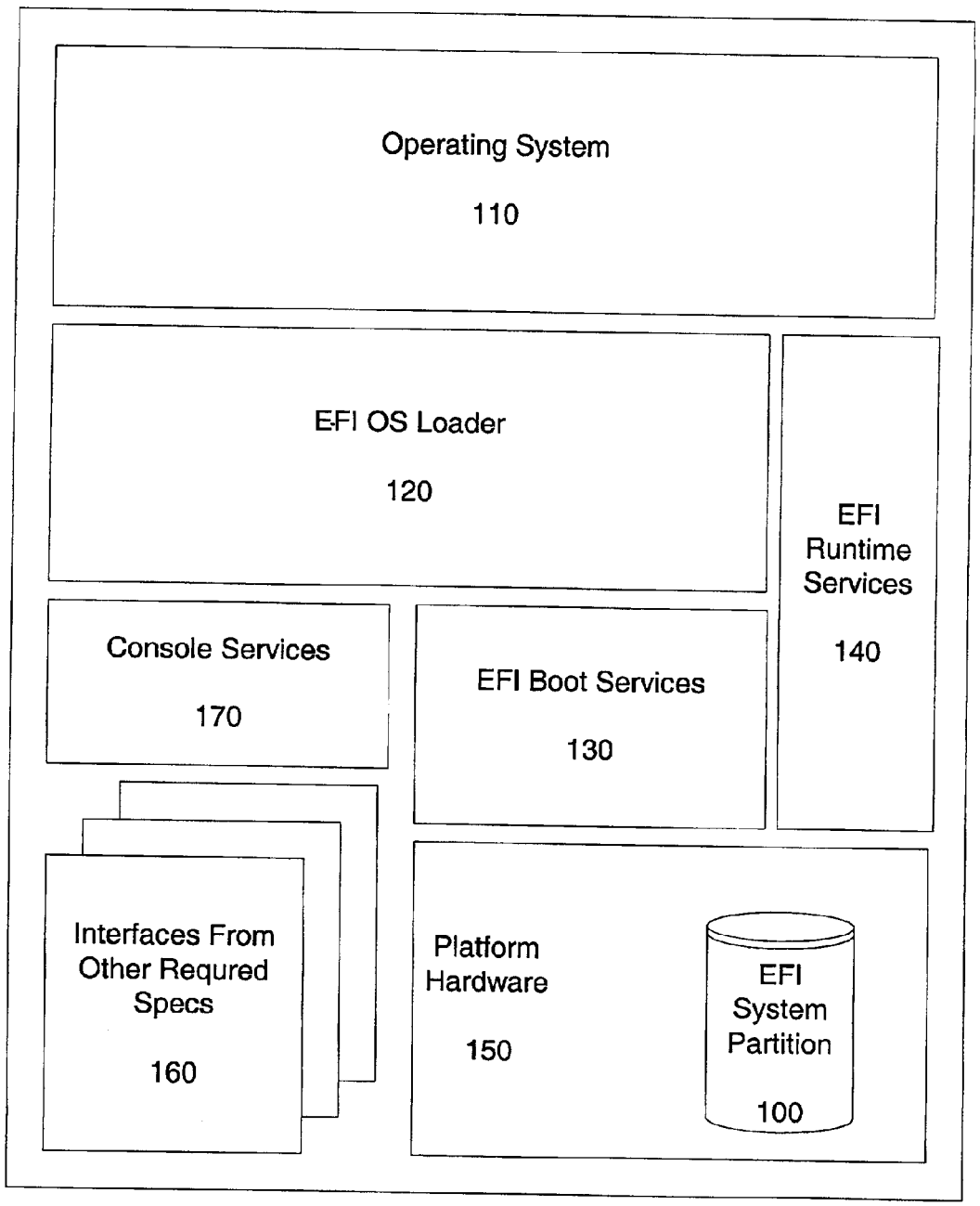
FIG. 1 shows a block diagram of the Extended Firmware Interface.
Figure 2:
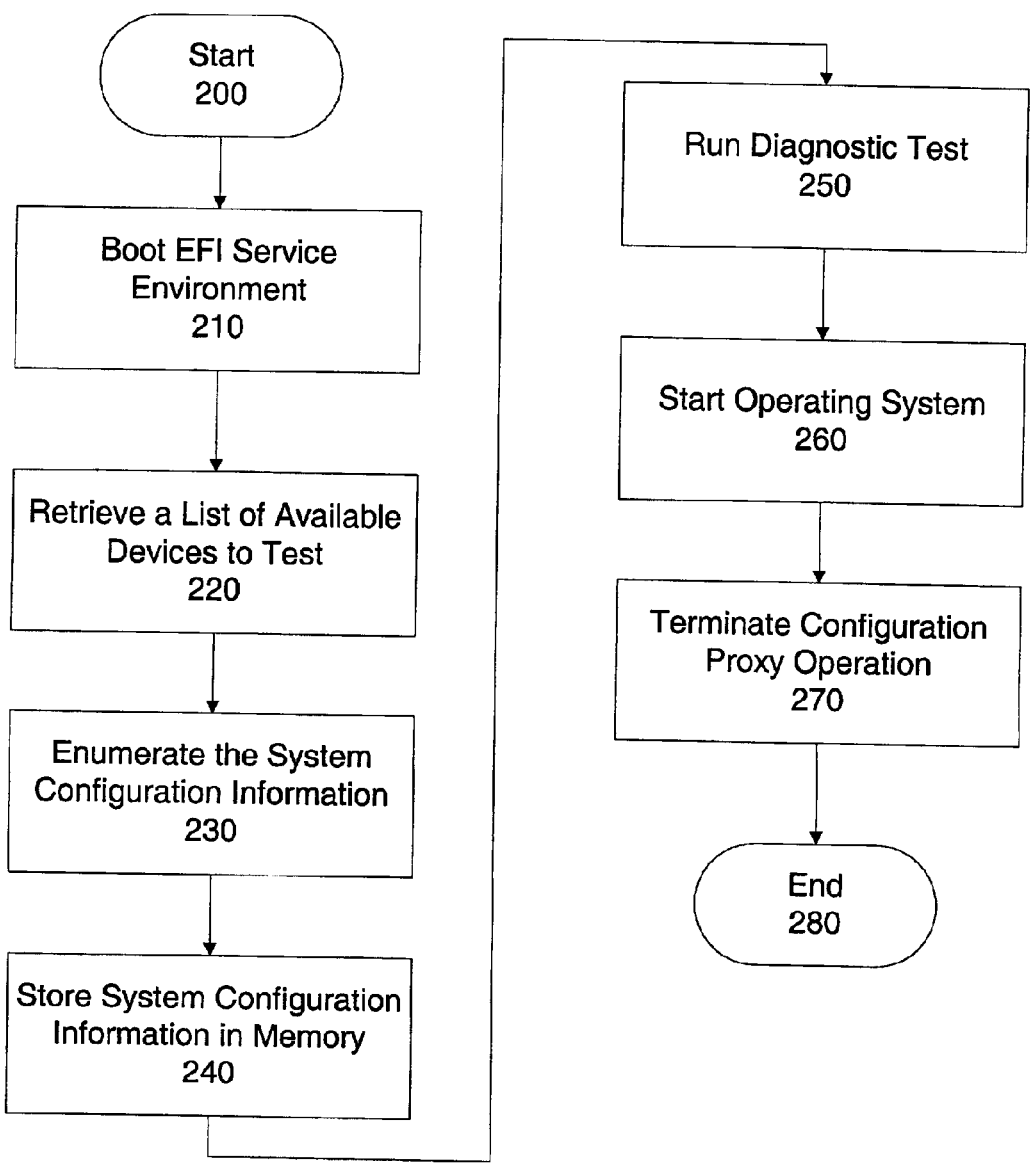
FIG. 2 shows a flowchart of an embodiment of the configuration proxy abstracting configuration information prior to booting the system.

FIG. 2 provides an example of one embodiment of the configuration proxy abstracting configuration information prior to booting the system. After startup or reset of the machine in operation 200, the EFI service environment is booted in operation 210. A list of available devices to test is retrieved in operation 220. The configuration proxy, in operation 230, enumerates the system configuration information. The system configuration information is then stored in memory in operation 240.

The configuration proxy is designed to provide a high degree of isolation between the test algorithms and the details of a platform's implementation. Thus, the configuration proxy is portable across different platforms and execution environments. The portability of the configuration proxy will help reduce maintenance and development costs of test modules. Test programmers will not need to write and maintain their own discovery algorithms. Instead of designing test algorithms specific to a given platform, the configuration proxy allows test algorithms to be used with multiple platforms by obtaining necessary configuration information through object class definitions. This removes dependence on independently developed and maintained methodologies. The underlying discovery infrastructure will be allowed to evolve independently of the tests in support of new architectures and features.

The discovered or saved information can be displayed by a local console or by remote applications that use the data. The discovered or saved information can also be used to auto-configure a test suite. Further, the information can be assessed by tests directly, as in operation 250 of FIG. 2.

Aside from diagnostics, the configuration proxy can be used with other applications such as utilities. The applications are used locally within the EFI service environment or remotely through protocols through the service environment. In the event that the applications are remote, the applications would be accessed through an EFI driver stack via either a local area network or a serial bus. If remote, the applications may be hosted by any operating system.

As previously stated, once the OS begins running in operation 260, the OS activity is given priority over the EFI service environment and the configuration proxy operation is terminated in operation 270.

Figure 3:
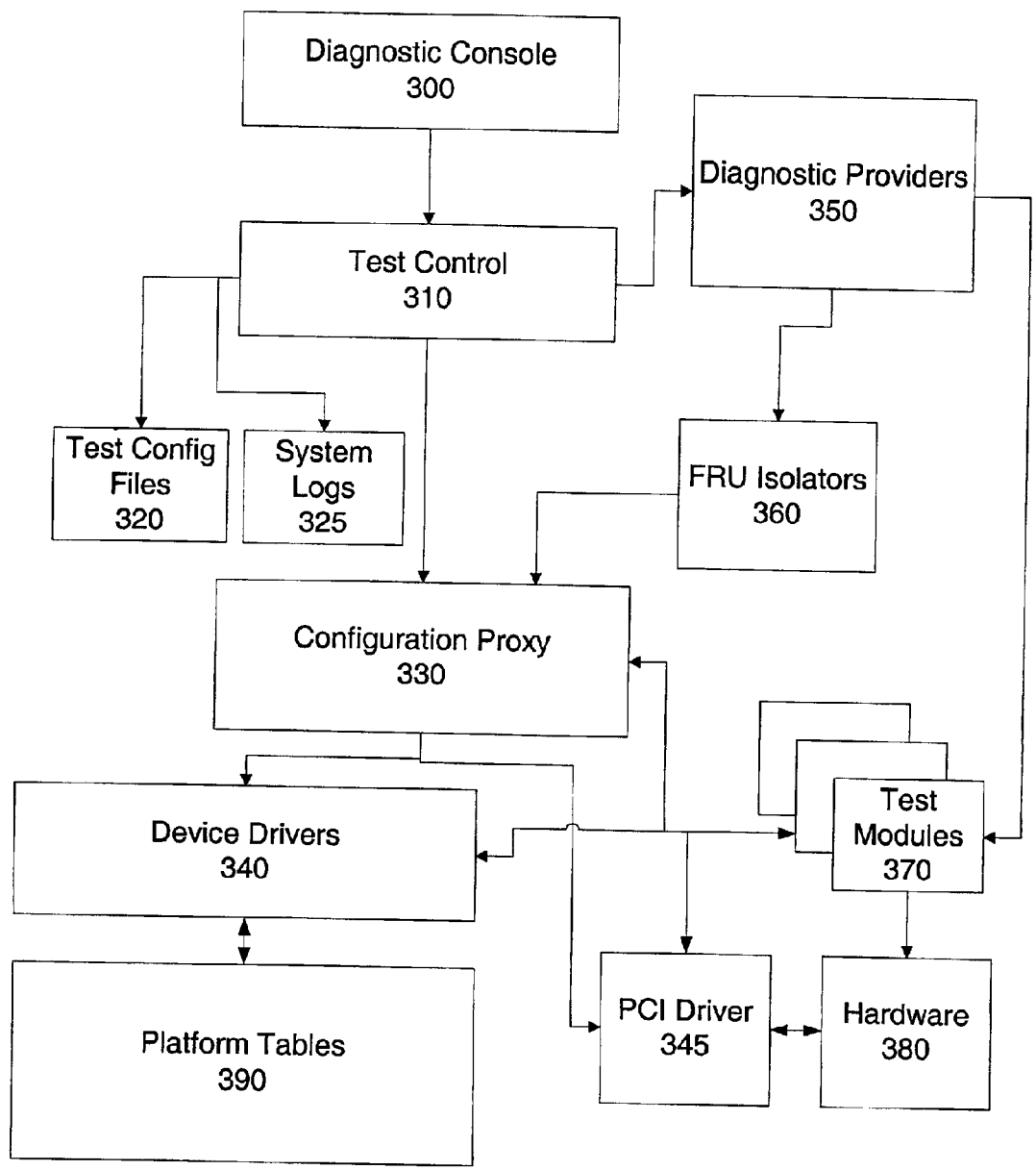
FIG. 3 shows a block diagram that illustrates an embodiment of a platform diagnostic architecture.

FIG. 3 depicts the high level architecture of a system, which includes a configuration proxy. The diagnostic console 300 sends a request to test control 310 to retrieve the list of available devices to test. The communication between the diagnostic console 300 and the test control 310 ensures that the tests available on the system are properly associated with the devices available. The test control 310 provides the system with the ability to test the hardware that the operating system is going to be used with. For one embodiment of the invention, a predetermined "gold configuration" is compared with the discovered configuration. If a bug is found in the firmware or the system did not discover the firmware either because the device is not responding or the firmware has a bug, the test control 310 issues a flag.

The test control module 310 utilizes the configuration proxy 330 to enumerate the system configuration information from the platform's firmware tables 390. The configuration information is retrieved either in object format as retrieved from the firmware tables 390 or plain text form. The configuration proxy 330 is not designed to be modified by users. For an embodiment of the invention, the platform firmware information obtained by the configuration proxy 330 is generated by whatever firmware tables are available. All abstracted information is made available and the tester is free to use whatever information is applicable.

For another embodiment of the invention, the test control 310 has knowledge of exactly which devices exist. In this embodiment, the test control 310 discovers which devices are available, gathers only information needed by the diagnostic tests, and applies the tests using the information gathered. There is a possibility that tests which access the test control 310 will require more information.

For yet another embodiment of the invention, the tests are able to access the configuration proxy 330 directly without having to access the test control 310. Tests may use the information from the configuration proxy 330 to access hardware through the drivers or port addresses which were configured by the EFI firmware, rather than having to have apriority knowledge of the system's configuration.

The platform's firmware tables 390 may include System Management Basic Input/Output System (SMBIOS) tables, Advanced Configuration and Power Interface (ACPI) tables, and Intelligent Platform Management Interface (IPMI) tables. The firmware setup programs are part of the discovery process at system power-up. The firmware is stored in system memory. The Basic Input/Output System (BIOS) performs initial queries after power-up. Thereafter, the operating system initializes itself and obtains information from industry standard tables such as SMBIOS and ACPI. Thus, the configuration proxy utilizes the same discovery mechanisms as the operation system in a pre-boot service environment.

The configuration proxy 330 takes advantage of the information gathering process administered by the EFI environment. Element 340 is a set of device drivers, which enable the communication between the configuration proxy and the platform firmware tables 390 by activating the firmware tables. The device drivers 340 are unique depending on whether the architecture is based on IA-32 or IA-64.

When ready to run diagnostics, the test control 310, using the content of the test configuration files 320, invokes diagnostic providers 350. Diagnostic providers 350 are middleware interfaces that abstract test modules 370 from the test session control application 310. This middleware may be implemented as either an EFI application or an EFI hosted python script. The configuration information gathered by the configuration proxy 330 may be used to auto-configure the diagnostic test suites. The diagnostic provider 350 calls test modules 370 to execute the tests on hardware 380. For an embodiment of the invention, the test models 370 are responsible for initiating call backs to configuration proxy 330 in order to gather the appropriate method to access the device under test.

Further, the diagnostic provider 350 relies on Field Replaceable Units (FRU) isolators 360 to identify failed replacement units. The FRU isolators can utilize the configuration proxy 330 to access the SMBIOS structures in the platform tables 390 and other configuration information to identify failed FRU's.

Aside from invoking diagnostic providers 350, the test control 310 may also store information in system logs 325. The information stored in the system logs 325 can then be assessed by the diagnostic console 300 through an application programming interface provided by test control 310. In some embodiments of the invention, the system logs may be accessed out of band through an apparatus such as a system management controller.

Figure 4:
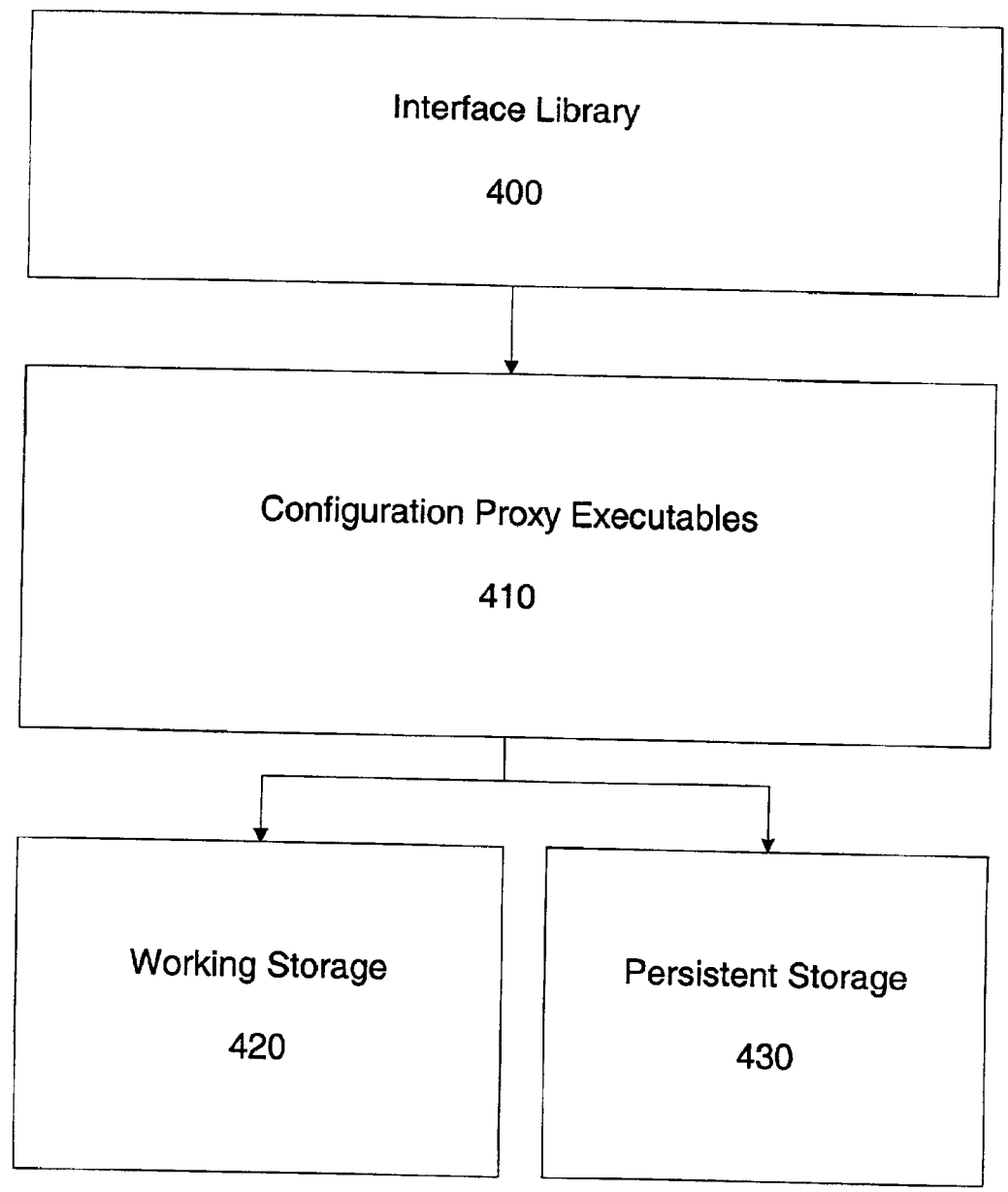
FIG. 4 shows a block diagram of an embodiment of the configuration proxy.

FIG. 4 depicts a diagram of the configuration proxy 330. The configuration proxy 330 is a platform diagnostics component that is issued to dynamically determine the target system's device configuration and to provide an abstracted object interface to the platform's configuration information sources through a set of executables 410. For one embodiment, a separate set of diagnostic support components for each system. The configuration proxy 430 enables each system to have a common framework. The common framework enables diagnostic components to be used with more than one platform. This robust implementation can be achieved on EFI supported systems by compiling the configuration proxy executables 410 in the EFI environment.

In addition to supporting abstractions of sources of system configuration information, the configuration proxy 430 also provides an interface for managing the stored configuration data. The external software interface to the configuration proxy service is abstracted by an interface library 400. Each device table may be accessed through a specific group of objects and methods as defined by the specific device driver. For example, ACPI has a predefined set of objects and methods required to access ACPI information from the tables. Similarly, SMBIOS has a set of predefined objects and methods. The objects and methods of each firmware device conform to their respective industry standards.

The external software interface to the configuration proxy service is abstracted by the interface library 400. The configuration proxy 430 provides persistent storage 430 of the configuration data. The configuration proxy 330 relies on the content of the persistent storage file 430 to keep track of the previously detected configuration information retrieved from the ACPI tables and other platform configuration information sources.

The recently detected configuration is stored in working storage 420. A working storage 420 is maintained by the configuration proxy 330. The working data reflects the discovered configuration. The discovered data can be different from the expected data. Thus, the architecture identifies installed devices, or objects, that are not responsive by comparing the persistent data with the working data.

The persistent data, however, should be pre-configured because the persistent data is a snapshot of the expected configuration. Another operational mode such as reboot will detect if the configuration has changed. The pre-configuration is performed during an operational mode by putting the tables into file format and then downloading the file into the persistent storage 430. Moreover, the persistent data can be used to detect if the firmware is bad at machine bootup by comparing the expected configuration to the detected configuration.

In addition, the pre-configured data is also useful for certification purposes. For example, the platform configuration can be certified by comparison with the pre-configured, persistent data. The persistent data is updated each time a change occurs. Therefore, there should be no changes that the persistent data does not know about.

Embodiments of the present invention may be implemented in hardware or software, or a combination of both.

However, preferably, embodiments of the invention may be implemented in computer programs executing on programmable computer systems each comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion.

Each program may be implemented in a high level procedural or object oriented programming language to communicate with the computer system. However, the programs may be implemented in assembly or machine language, if desired. In any case, the language may be a compiled or interpreted language.

Each such computer program may be stored on a storage media or device (e.g., hard disk drive, floppy disk drive, read only memory (ROM), CD-ROM device, flash memory device, digital versatile disk (DVD), or other storage device) readable by a general or special purpose programmable computer system, for configuring and operating the computer system when the storage media or device is read by the computer system to perform the procedures described herein. Embodiments of the invention may also be considered to be implemented as a machine-readable storage medium, configured for use with a computer system, where the storage medium so configured causes the computer system to operate in a specific and predefined manner to perform the functions described herein.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A method for a digital computer of providing system configuration information to applications, comprising:
    booting a service environment prior to running an operating system;
    retrieving a list of available devices to test;
    enumerating the system configuration information from a plurality of platform tables;
    storing the system configuration information in memory; and
    auto-configuring a test suite using the stored system configuration information.

2. The method of claim 1, further comprising running an operating system.

3. A system comprising:
    a diagnostic console;
    a test control coupled to a diagnostic console, wherein the test control retrieves the list of available devices to test;
    a configuration proxy coupled to the test control, wherein the configuration proxy provides an abstract object interface to configuration information sources;
    a plurality of firmware table drivers coupled to the configuration proxy; and
    a plurality of firmware tables coupled to the plurality of firmware table drivers.

4. The system of claim 3, wherein the plurality of firmware tables comprise:
    an Advanced Configuration and Power Interface table;
    a System Management Basic Input/Output System table; and
    an Intelligent Platform Management Interface table.

5. The system of claim 4, wherein the plurality of firmware tables further comprise a Peripheral Component Interconnect driver.

6. The system of claim 3, wherein the configuration proxy comprises:
    an interface library;
    a set of executable code; and
    a memory array.

7. The system of claim 6, wherein the memory array comprises:
    a working storage unit, wherein the working storage unit stores the discovered system configuration; and
    a persistent storage unit, wherein the persistent storage unit stores the pre-configured data.

8. The system of claim 3, wherein each of the plurality of firmware tables is coupled to an individual firmware table driver.

9. An article comprising a machine readable medium having a plurality of machine readable instructions, wherein when the instructions are executed by a processor, the instructions cause a system to:
    discover firmware tables at a pre-boot service environment;
    present platform device information through a plurality of object interfaces during the pre-boot service environment; and
    use the platform device information to configure diagnostic test suites.

10. The article of claim 9, comprising a machine readable medium having a plurality of machine readable instructions, wherein when the instructions are executed by a processor, the instructions further cause a system to:
    provide end users with a plurality of diagnostic tests; and
    make the plurality of diagnostic tests available to execute.

11. An apparatus comprising:
    means for obtaining system configuration information in a pre-boot service environment;
    means for storing configuration data;
    means for providing an interface to manage the stored configuration data; and
    means for using configuration data to auto-configure diagnostic test suites.

12. A method of identifying unresponsive installed devices of a system, comprising the steps of:
    storing me-configured data in a persistent storage;
    discovering the system configuration; storing the discovered system configuration data in the working storage;
    comparing the data in the persistent storage with the data in the working storage,
    wherein the step of storing pre-configured data is performed during an operational mode prior to booting the system, wherein the data is converted from a table format to a file format.

* * * * *

UNITED STATES PATENT AND TRADEMARK OFFICE
CERTIFICATE OF CORRECTION

PATENT NO. : 6,901,534 B2
DATED : May 31, 2005
INVENTOR(S) : Carr

It is certified that error appears in the above-identified patent and that said Letters Patent is hereby corrected as shown below:

Column 6,
Line 53, delete "me-configured" and insert -- pre-configured --.

Signed and Sealed this

Ninth Day of August, 2005

JON W. DUDAS
*Director of the United States Patent and Trademark Office*